United States Patent
Ratner et al.

(10) Patent No.: US 10,692,184 B2
(45) Date of Patent: Jun. 23, 2020

(54) SUPER-RESOLUTION X-RAY IMAGING METHOD AND APPARATUS

(71) Applicant: SVXR, INC., San Jose, CA (US)

(72) Inventors: Edward R. Ratner, Madison, SD (US); David L. Adler, San Jose, CA (US)

(73) Assignee: SVXR, INC., San Jose, CA (US)

( * ) Notice: Subject to any disclaimer, the term of this patent is extended or adjusted under 35 U.S.C. 154(b) by 121 days.

(21) Appl. No.: 16/053,627

(22) Filed: Aug. 2, 2018

(65) Prior Publication Data
US 2020/0013145 A1    Jan. 9, 2020

Related U.S. Application Data

(60) Provisional application No. 62/694,319, filed on Jul. 5, 2018.

(51) Int. Cl.
| | |
|---|---|
| G01N 23/04 | (2018.01) |
| G06T 3/40 | (2006.01) |
| G01N 23/18 | (2018.01) |
| G06T 5/50 | (2006.01) |
| G06K 9/62 | (2006.01) |

(52) U.S. Cl.
CPC ........... *G06T 3/4053* (2013.01); *G01N 23/04* (2013.01); *G01N 23/18* (2013.01); *G06T 5/50* (2013.01); *G06K 9/6257* (2013.01); *G06K 9/6269* (2013.01); *G06T 2207/10116* (2013.01); *G06T 2207/20081* (2013.01); *G06T 2207/20084* (2013.01); *G06T 2207/20221* (2013.01)

(58) Field of Classification Search
None
See application file for complete search history.

(56) References Cited

U.S. PATENT DOCUMENTS

| | | | | |
|---|---|---|---|---|
| 7,075,059 B2 * | 7/2006 | Oldham | ............. | G01N 21/6458 250/208.1 |
| 7,199,357 B1 * | 4/2007 | Oldham | ............. | G01N 21/6458 250/208.1 |
| 7,323,681 B1 * | 1/2008 | Oldham | ............. | G01N 21/6428 250/208.1 |

(Continued)

OTHER PUBLICATIONS

PCT International Search Report and Written Opinion of the International Searching Authority for Application No. PCT/US2019/039329 dated Nov. 4, 2019 (dated Nov. 4, 2019) (12 sheets).

(Continued)

*Primary Examiner* — Thomas R Artman
(74) *Attorney, Agent, or Firm* — Okamoto & Benedicto LLP

(57) ABSTRACT

The presently-disclosed technology improves the resolution of an x-ray microscope so as to obtain super-resolution x-ray images having resolutions beyond the maximum normal resolution of the x-ray microscope. Furthermore, the disclosed technology provides for the rapid generation of the super-resolution x-ray images and so enables real-time super-resolution x-ray imaging for purposes of defect detection, for example. A method of super-resolution x-ray imaging using a super-resolving patch classifier is provided. In addition, a method of training the super-resolving patch classifier is disclosed. Other embodiments, aspects and features are also disclosed.

27 Claims, 13 Drawing Sheets

(56) References Cited

U.S. PATENT DOCUMENTS

| | | |
|---|---|---|
| 9,042,517 B2 | 5/2015 | Fukuda et al. |
| 9,186,117 B2 | 11/2015 | Ogura et al. |
| 9,392,988 B2 | 7/2016 | Kobayashi |
| 9,528,915 B2 * | 12/2016 | Adiga ............... G01N 1/06 |
| 9,532,753 B2 | 1/2017 | Kim et al. |
| 9,948,843 B2 * | 4/2018 | Ding ............... G02B 23/2407 |
| 10,473,558 B2 * | 11/2019 | Adiga ............... G01N 1/286 |
| 2014/0064445 A1 | 3/2014 | Adler |
| 2014/0112531 A1 | 4/2014 | Jung et al. |
| 2014/0118529 A1 | 5/2014 | Zheng et al. |
| 2014/0130613 A1 * | 5/2014 | Adiga ............... G01N 1/06 |
| | | 73/863.01 |
| 2015/0042767 A1 | 2/2015 | Ciurea et al. |
| 2015/0071402 A1 | 3/2015 | Handa |
| 2015/0289833 A1 | 10/2015 | Yamanaka et al. |
| 2016/0199012 A1 | 7/2016 | Choi et al. |
| 2016/0331336 A1 | 11/2016 | Hertz et al. |
| 2016/0345919 A1 | 12/2016 | Kim et al. |
| 2017/0074755 A1 * | 3/2017 | Adiga ............... G01N 1/06 |
| 2017/0146788 A1 | 5/2017 | Waller et al. |
| 2017/0345130 A1 | 11/2017 | Wang et al. |
| 2017/0366714 A1 * | 12/2017 | Ding ............... G02B 23/2407 |
| 2018/0182067 A1 | 6/2018 | Liu et al. |
| 2018/0242938 A1 | 8/2018 | Tanaka et al. |
| 2018/0279972 A1 | 10/2018 | Tanabe et al. |
| 2019/0325621 A1 * | 10/2019 | Wang ............... A61B 6/032 |

OTHER PUBLICATIONS

Chao Dong, et al. "Image Super-Resolution Using Deep Convolutional Networks", Jul. 31, 2015, 14 pages, Department of Information Engineering, The Chinese University of Hong Kong.

Wenzhe Shi, et al. "Real-Time Single-Image and Video Super Resolution Using an Efficient Sub-Pixel Convolutional Neural Network", Sep. 23, 2016, 10 pages, Magic Pony Technology, Imperial College of London.

* cited by examiner

Method of super-resolution x-ray imaging for defect detection
1000

FIG. 4

Array of trained SRPC instances

Single high-resolution x-ray image divided into high-resolution patches

Exemplary method of training a super-resolution patch classifier

Single lower-resolution x-ray image divided into patches

SUPER-RESOLUTION X-RAY IMAGING METHOD AND APPARATUS

CROSS-REFERENCE TO RELATED APPLICATION(S)

This application claims the benefit of U.S. Provisional Application No. 62/694,319, filed on Jul. 5, 2018. The aforementioned application is hereby incorporated herein by reference in its entirety.

BACKGROUND OF THE INVENTION

1. Field of the Invention

The present disclosure relates to methods and apparatus for x-ray imaging.

2. Description of the Background Art

One aspect of the present disclosure relates to the examination and inspection of objects using x-rays that have structures of interest on the micrometer to nanometer scale. Such objects include integrated circuits (ICs) and integrated circuit packaging, including multi-chip packages (MCPs) with silicon interposers and through-silicon vias (TSVs). Certain natural objects (crystals or quasi-crystals) or biological structures may also be examined using these techniques.

SUMMARY

The presently-disclosed technology improves the resolution of an x-ray microscope so as to obtain super-resolution x-ray images having resolutions beyond the maximum normal resolution of the x-ray microscope. Furthermore, the disclosed technology provides for the rapid generation of the super-resolution x-ray images and so enables real-time super-resolution x-ray imaging for purposes of defect detection, for example. A method of super-resolution x-ray imaging using a super-resolving patch classifier is provided. In addition, a method of training the super-resolving patch classifier is disclosed.

Other embodiments, aspects and features are also disclosed.

DESCRIPTION OF THE DRAWINGS

FIG. 4 depicts an array of super-resolving patch classifiers in accordance with an embodiment of the invention.

DETAILED DESCRIPTION

Recently, in U.S. Pat. No. 9,129,715, issued Sep. 8, 2015, Adler et al. has disclosed an innovative x-ray microscope with a high flux x-ray source that allows high speed metrology or inspection of objects such as integrated circuits (ICs), printed circuit boards (PCBs), and other IC packaging technologies. The object to be investigated is illuminated by collimated, high-flux x-rays from an extended source having a designated x-ray spectrum. The system also comprises a stage to control the position and orientation of the object; a scintillator that absorbs x-rays and emits visible photons positioned in very close proximity to (or in contact with) the object; an optical imaging system that forms a highly magnified, high-resolution image of the photons emitted by the scintillator; and a detector such as a CCD array to convert the image to electronic signals.

The present disclosure provides a technology for improving the resolution of the x-ray images obtainable by a high-speed x-ray imager, such as that disclosed by Adler et al. in U.S. Pat. No. 9,129,715, or an instrument with a conventional x-ray microscope geometry. The presently-disclosed technology improves the resolution beyond the maximum normal resolution of the x-ray microscope. Furthermore, the disclosed technology provides for the rapid generation of the super-resolution x-ray images and so enables real-time super-resolution x-ray imaging for purposes of defect detection.

Figure 1A:
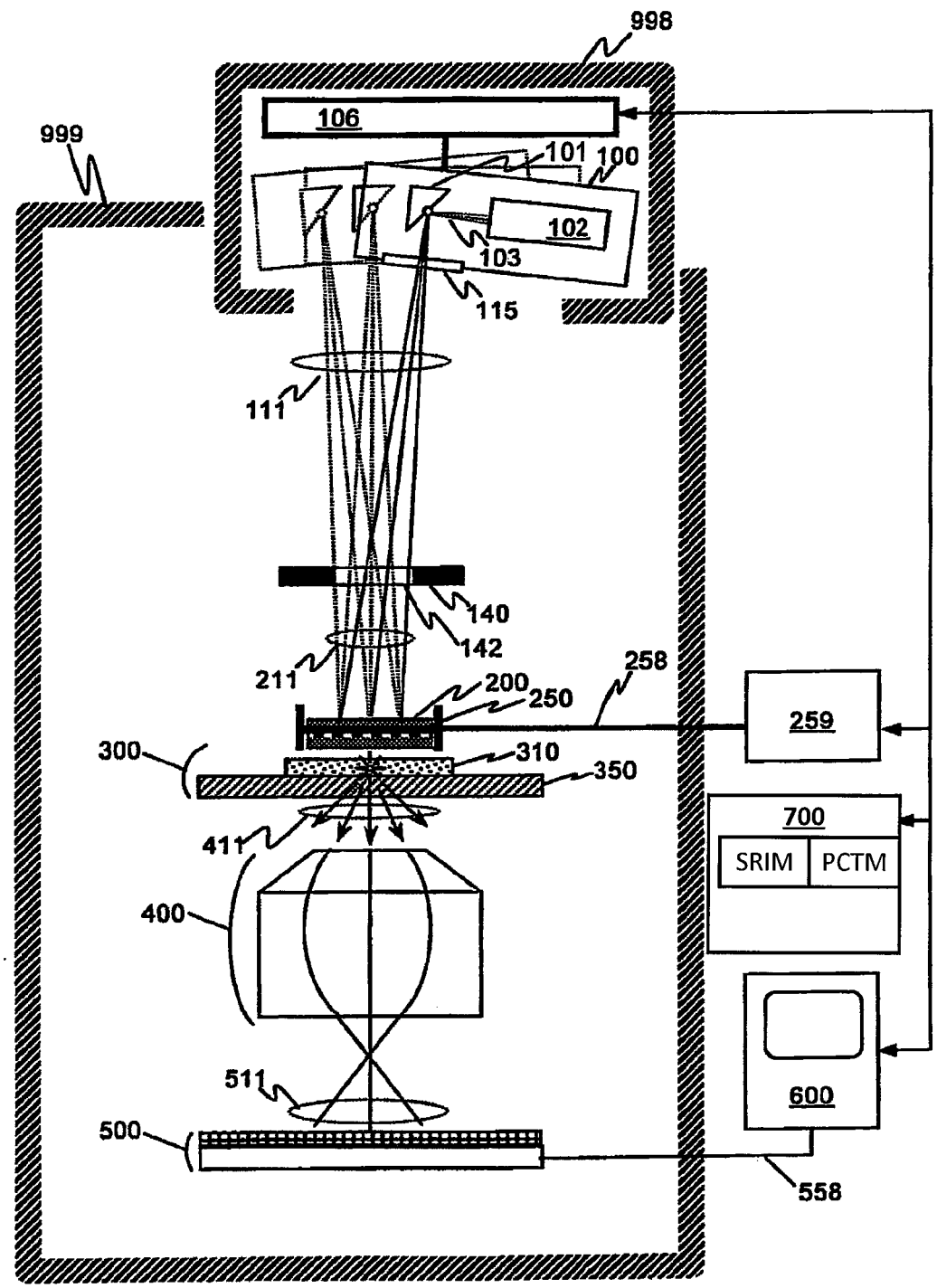
FIG. 1A illustrates an overview in cross-section of a high-speed x-ray imaging system in accordance with a preferred embodiment of the invention.

FIG. 1A illustrates an overview in cross-section of an embodiment of a high-speed x-ray imaging system in accordance with a preferred embodiment of the invention. An x-ray emitter 101 emits x-rays 111. These x-rays are then shaped into a collimated x-ray beam 211, in some embodiments using distance from the emitter 101 and a plate 140 with an aperture 142. This collimated x-ray beam 211 then illuminates an object 200 to be examined. The x-rays that are transmitted through the object 200 illuminate a scintillator assembly 300 comprising a scintillator 310 and, in some embodiments, a support 350 for the scintillator. The scintillator 310 absorbs a portion of the x-rays and releases some of the energy so absorbed with the emission of visible photons 411.

Using an optical system 400, a magnified image 511 of the visible photons 411 emitted by the scintillator is formed on an image detector 500. The image detector 500 converts the intensity of the magnified image 511 to an electronic signal. The image detector 500 can comprise an electronic sensor, such as a charge-coupled device (CCD), or another image sensor known to those skilled in the art. The electronic signal is transmitted through a connector 558 to a system of electronics 600 that, in some embodiments can display the image results, and in some embodiments can store the image results and/or perform image processing algorithms on the image results in conjunction with one or more computer systems 700.

For any source emitting ionizing radiation such as x-rays, it is often wise to provide shielding 998 around the x-ray source 100, and in some situations legally required for operation. Such shielding 998 can be a simple enclosure of shaped sheets of lead metal, or a more intricate design fabricated from any of a number of x-ray absorbing materials, such as lead-doped glass or plastic, that will be known to those skilled in the art. Shielding is desirable to keep random x-rays, either directly from the emitter 101 or reflected from some other surface, from causing unwanted effects, particularly spurious signals in the various electronic components used to control the system.

Likewise, for some embodiments, additional shielding 999 around the beam path may also be desired, and in some cases be legally required for operation. Such additional shielding 999 can be a simple enclosure of shaped sheets of lead metal, or a more intricate design fabricated from any of a number of x-ray absorbing materials such as lead-doped glass or plastic, that will be known to those skilled in the art. Additional shielding 999 is desirable to keep random x-rays, either directly from the emitter 101 or reflected from some other surface, from causing unwanted effects, particularly spurious signals in the various electronic components used to control the system.

Because certain image detectors 500 such as those comprising CCD sensors can be particularly sensitive to x-ray exposure, in some embodiments a portion of the scintillator assembly 300 may also be fabricated in whole or in part using a material, such as a lead-doped glass, which absorbs x-rays while transmitting the visible photons 411 emitted by the scintillator. Other embodiments comprising a system design that places the image sensor 510 out of the x-ray beam path, as will be disclosed in more detail later in this application, may also be used if additional isolation from x-rays is desired.

As depicted in FIG. 1A, the x-ray source may comprise a mount 106 that can move the position of the x-ray source 100 relative to the object 200, thereby changing the angle of incidence of the x-ray beam on the object. The mount 106 can be designed to allow the x-ray source 100 to swing in the x-z plane, in the y-z plane, or any other combination of axes. The source can also be moved along the z-axis to move the x-ray source 100 closer to the object 200. This may have the effect of making the beam brighter, increasing signal strength, at the cost of having an x-ray beam that is less collimated, reducing resolution. This effect may be reduced or eliminated by reducing the spot size of the x-ray source.

Motion of the x-ray source 100 using the mount 106 may be controlled by the computer system 700 several ways. In some embodiments, the source mount 106 may move the x-ray source 100 to a fixed location to allow an image to be captured. In some embodiments, the mount 106 can move the x-ray source 100 continuously as images are gathered, allowing the dynamic change of x-ray intensity as transmitted through the object 200 to be recorded as a function of illumination angle. In some embodiments, the x-ray emitter 101 may be moved to at least 10 degrees off the normal incidence angle.

In some embodiments, further adjustment of the angle of incidence of the x-ray beam 211 on the object 200 may be achieved by coordinating the motion of the x-ray source 100 using the source mount 106 with the motion of the object 200 using the object mount 250. In some embodiments, the motion of the mount 250 is controlled by a controller 259 through a connector 258. The controller 259 is in turn directed either by direct input from an operator, or by electronic instructions provided by the computer system 700.

In some embodiments, the shielding 998 will be designed to enclose the x-ray source 100 and the source mount 106. In other embodiments, the shielding 998 can be designed to only enclose the x-ray source, with the mount 106 designed to move the shielding 998 as it moves the x-ray source 100.

In some embodiments of the invention, multiple x-ray sources may be used to produce images with different angles of incidence. The x-ray sources may be fixed in space or moveable, and they may be operated sequentially or simultaneously. The x-ray sources may be operated manually or controlled by one or more computer systems 700.

As depicted in FIG. 1A, for the super-resolving capability, the computer system 700 includes a super-resolving imaging module (SRIM) and a patch classifier training module (PCTM). The SRIM implements a method for generating super-resolution x-ray images which is described below in relation to FIG. 3. The PCTM implements a method of training a super-resolving patch classifier, the training method being described below in relation to FIG. 9.

Figure 1B:
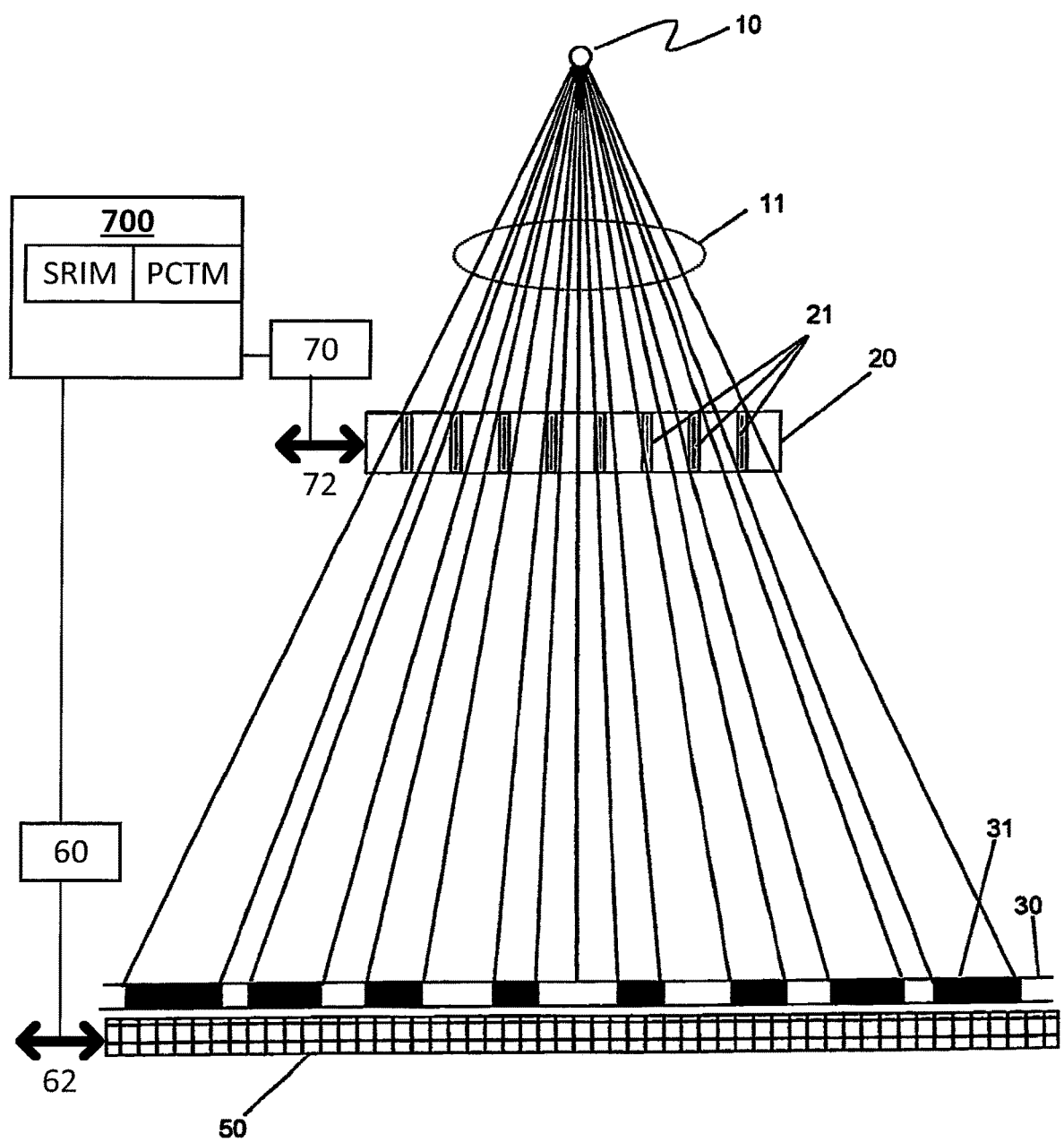
FIG. 1B illustrates an overview in cross-section of an imaging system based on a conventional x-ray microscope geometry in accordance with an alternate embodiment of the invention.

FIG. 1B illustrates an overview in cross-section of an imaging system based on a conventional x-ray microscope geometry in accordance with an alternate embodiment of the invention. The depicted system uses point projection microscopy (PPM) to form images of objects, such as integrated circuits, printed circuit boards, or other packaging structures such as interposers. Direct shadows of objects are formed using x-rays emitted from a small point source.

In particular, a "point" source 10 emits x-rays 11 at a wide range of angles. The object 20 to be examined comprising detailed structures 21 is placed some distance away, so that it casts an enlarged shadow 30 comprising features 31 corresponding to the structures 21 on a detection screen 50 some distance behind the object.

The advantage to the system in FIG. 1B is its simplicity—it is a simple shadow projection, and the magnification can be increased by simply placing the detector farther away. By not using inefficient zone plates, higher intensity and therefore faster image collection times are achieved. For an object of infinite thinness and with no internal structure, this may be adequate. Unfortunately, integrated circuits and packaging materials are not infinitely thin; they have complex 3D structures, and the wide angular range of the shadow projection system means that identical features illuminated at an angle cast very different shadows from those same features illuminated head on. This parallax error, illustrated in FIG. 1B, must be taken into account in the image analysis of any shadow projection system, and prevents its easy use in an inspection system, since pixel-by-pixel comparison is impossible for images taken with different illumination angles. Resolution is also an issue with PPM systems.

Although x-ray wavelengths can be chosen to be short enough that significant diffraction does not occur, blurring is still a significant problem. The "point" source is actually the spot where an electron beam collides with an anode, and a typical x-ray source spot is at least 1 micron in diameter. The resolution of the shadow is therefore limited by the size of the original source spot, and at some distance, the shadows from an extended source will blur.

In an alternate embodiment, the technique for performing super-resolution x-ray imaging may be used with the such a PPM system as depicted in FIG. 1B. As depicted, for the super-resolving capability, the system includes a computer system 700 which includes a SRIM and a PCTM. The SRIM implements a method for generating super-resolution x-ray images which is described below in relation to FIG. 3. The PCTM implements a method of training a super-resolving patch classifier, the training method being described below in relation to FIG. 9.

In addition, for the super-resolving capability, the system in FIG. 1B may further include a detector position controller 60 and a detector position actuator 62. The computer system 700 is communicatively coupled to the detector position controller 60 which controls the lateral positioning of the detector (detection screen) 50 using the actuator 62. Alternately, or in addition, the system in FIG. 1B may further include an object position controller 70 and a object position drive 72. The computer system 700 is communicatively coupled to the detector position controller 70 which controls the lateral positioning of a stage holding the object 20 using the actuator 72.

Figure 2:
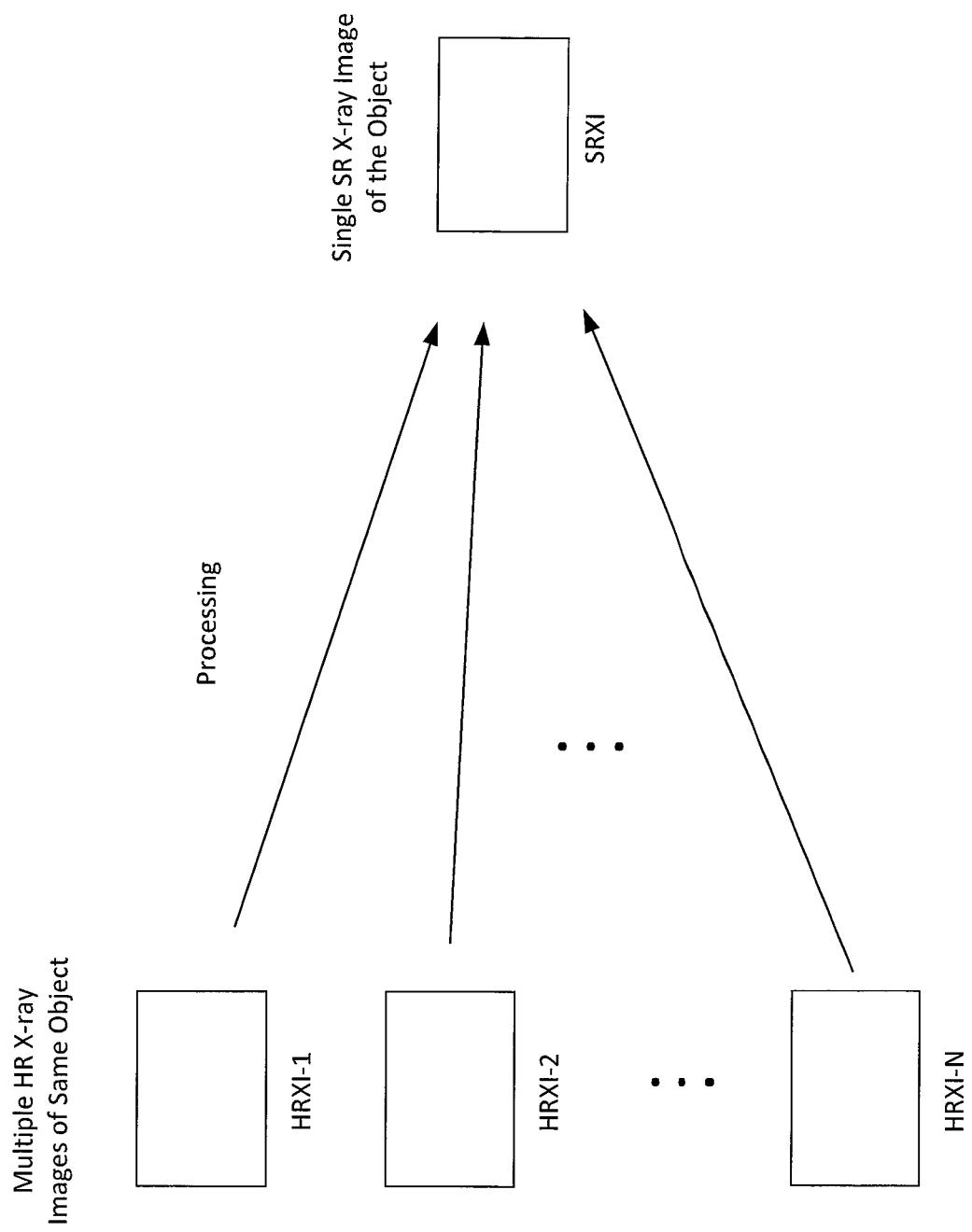
FIG. 2 is a diagram depicting a high-level view of super-resolution x-ray imaging in accordance with an embodiment of the invention.

FIG. 2 is a diagram depicting a high-level view of super-resolution x-ray imaging in accordance with an embodiment of the invention. A set of N high-resolution x-ray images (HRXI-1, HRXI-2, . . . , HRXI-N) are obtained from a same object which is being imaged. However, the imaging conditions of each of the N x-ray images in the set are different. For example, the angle of incidence of the x-ray beam may be different between the x-ray images.

Subsequently, processing is performed on the set of N high-resolution x-ray images to generate a super-resolution x-ray image (SRXI) of the object. The processing performed uses a trained super-resolution patch classifier (SRPC) and is described in detail herein.

Figure 3:
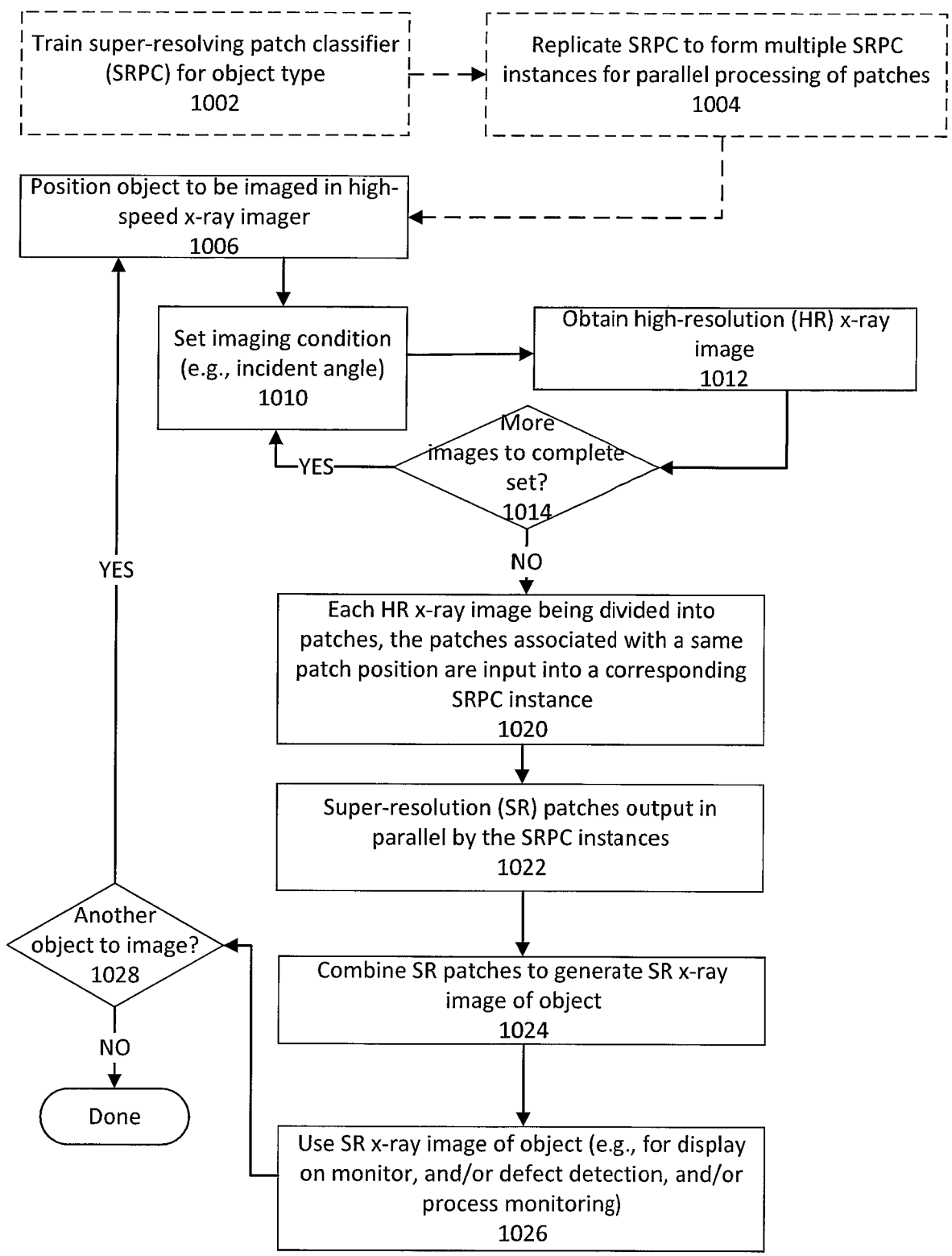
FIG. 3 is a flow chart of a method of super-resolution x-ray imaging of an object for defect detection in accordance with an embodiment of the invention.

FIG. 3 is a flow chart of a method 1000 of super-resolution x-ray imaging of an object for defect detection in accordance with an embodiment of the invention. The method 1000 may be performed, for example, under control of a super-resolution imaging module (SRIM) which may be executed, for example, by the computer system 700 in FIG. 1A or FIG. 1B.

The method 1000 as depicted includes two preliminary steps (1002 and 1004). These preliminary steps are not necessary to be performed again if they have been previously performed for the object type.

The first preliminary step involves the training 1002 of a super-resolution patch classifier (SRPC) for the object type. For example, if the object is a type of semiconductor package, then the SRPC may be trained with samples of that type of semiconductor package. As another example, if the object is a type of printed circuit board, then the SRPC may be trained with samples of that type of printed circuit board. An exemplary method 1100 for implementing the training 1002 of the SRPC for the object type is described below in relation to FIG. 9. The method 1100 may be performed, for example, under control of a patch classifier training module (PCTM) which may be executed, for example, by the computer system 700 in FIG. 1A or 1B.

Figure 4:
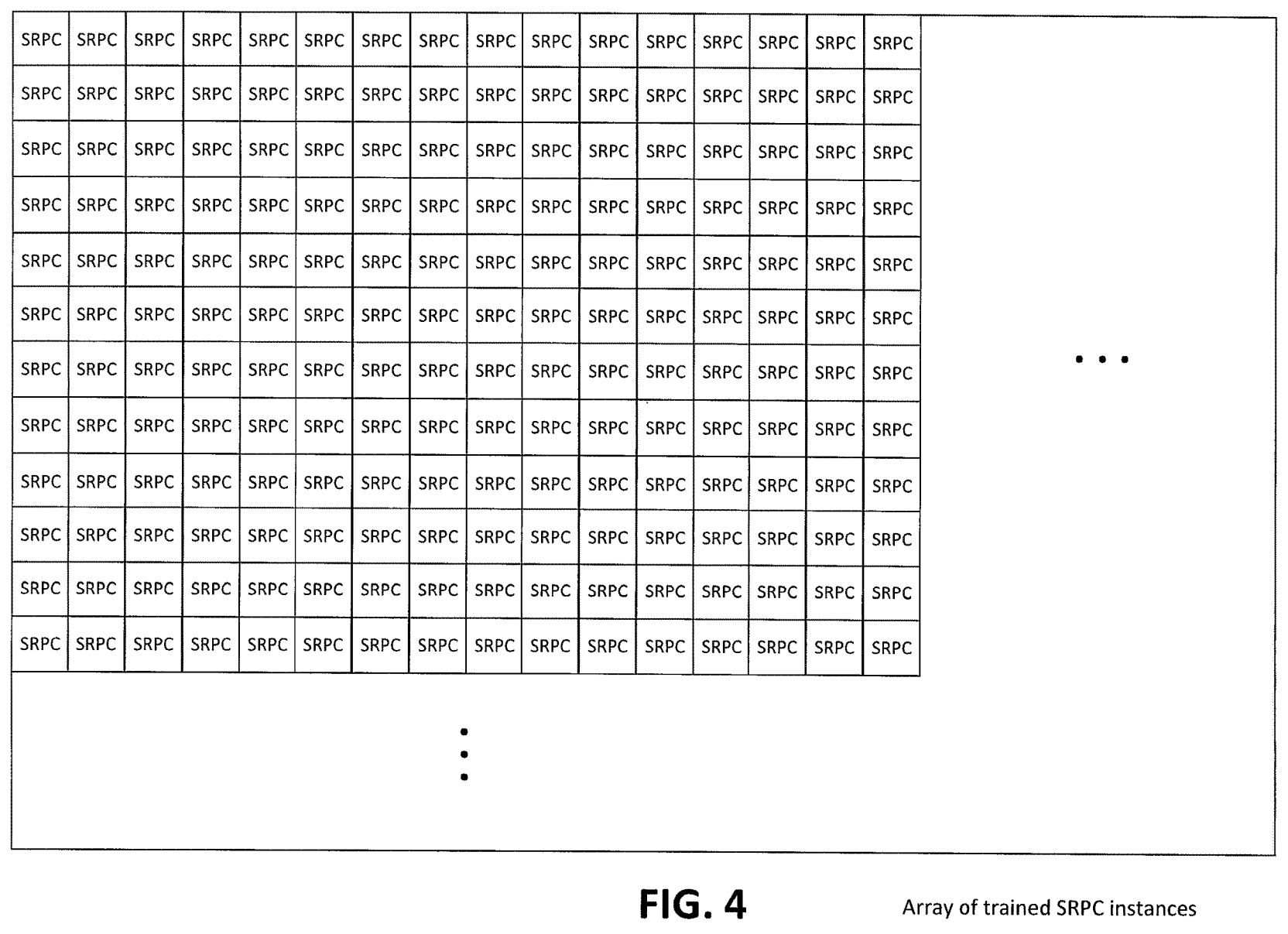

The second preliminary step involves replicating 1004 the trained SRPC to form an array of trained SRPC instances, an example of which is depicted in FIG. 4. The array of trained SRPC instances may be implemented using a parallel computing platform, such as that provided, for example, by graphic processing units of NVIDIA Corporation of Santa Clara, Calif.

The number of patches is preferably a multiple of the number of trained SRPC instances. For maximum parallelization, the numbers will be equal. On a particular computing platform [i.e. a graphics processing unit (GPU) based system or a central processing unit (CPU) based system), the system may be optimized for maximal throughput.

Subsequently to the preliminary steps 1002 and 1004, the steps 1006 to 1028 may be used to perform imaging of one or more objects of the same type as that used to train the SRPC in step 1002.

Per step 1006, the object to be imaged is positioned in an x-ray imager, such as the high-speed x-ray imager described above in relation to FIG. 1A, or such as the x-ray microscope based imager which is described above in relation to FIG. 1B. The object to be imaged in the high-speed x-ray imager of FIG. 1A is shown as the object 200, and the object to be imaged in the x-ray microscope based imager of FIG. 1B is shown as the test object 20.

Per step 1010, an imaging condition for the x-ray imager is set. In an exemplary implementation which uses the high-speed x-ray imager of FIG. 1A, the imaging condition may be set by setting the angle of incidence of the x-rays onto the surface of the object. In an alternate implementation which uses the x-ray microscope geometry of FIG. 1B, the imaging condition may be set by controlling a detector position or an object position. In the former case, the detector may be moved by a sub-pixel distance, while the source and object remain fixed. In the latter case, the object (i.e. the sample or the target) may be moved by a sub-pixel amount, while leaving the source and detector fixed.

In the implementation that changes the angle of incidence, the angle of incidence may be set by controlling the source position. Note that the geometry of the x-ray imager described in relation to FIG. 1A is such that a small, but controllable, change in the position of the x-ray source (so as to change the incident angle) results in a much smaller change in the landing position of the incident x-ray beam. The change in the landing position may be approximately two orders of magnitude (i.e. a hundred times) smaller than the change in the source position. This enables the very small changes (sub-pixel shifts) in the x-ray beam landing position to be consistently made by controlling the position of the x-ray source.

In the implementation that changes the detector position, the detector position may be set by controlling a lateral position of the detector in two dimensions. The lateral position may be controlled in a finely tuned manner so as to shift the detector position by sub-pixel distances.

Similarly, in the implementation that changes the object position, the detector position may be set by controlling a lateral position of the object in two dimensions. The lateral position may be controlled in a very finely tuned manner so as to shift the object position by sub-pixel distances (where the pixel distance is smaller at the object than at the detector due to the geometry of the apparatus).

Per step 1012, a high-resolution x-ray image of the object is obtained. In an exemplary implementation, this x-ray image may be obtained at a maximum or near maximum resolution setting of the high-speed x-ray imager. For instance, the high-resolution x-ray image may have a resolution of one micron.

Per step 1014, a determination may be made as to whether there are further x-ray images to be obtained so as to complete a set of N high-resolution x-ray images. For example, the set of high-resolution x-ray images obtained may have N=3 (or N=4, or N=5, . . . ) different x-ray images therein. (The number of x-ray images in the set must be two or more.) More x-ray images in the set will result in greater resolution and/or greater accuracy achievable by the presently-disclosed super-resolving technology. The trade-off being that more x-ray images in the set generally require more time to obtain and more resources to process. The images are collected in a way such the corresponding change in incident angle (using high-speed x-ray imager of FIG. 1A), or detector position or object position (using x-ray microscope of FIG. 1B) results in sub-pixel shifts between the images.

If there are more x-ray images to be obtained to complete the set of N high-resolution x-ray images, then the method 1000 may loop back to perform step 1010. Otherwise, if the set of N high-resolution x-ray images is complete, then the method 1000 may move forward to step 1020.

Figure 5:
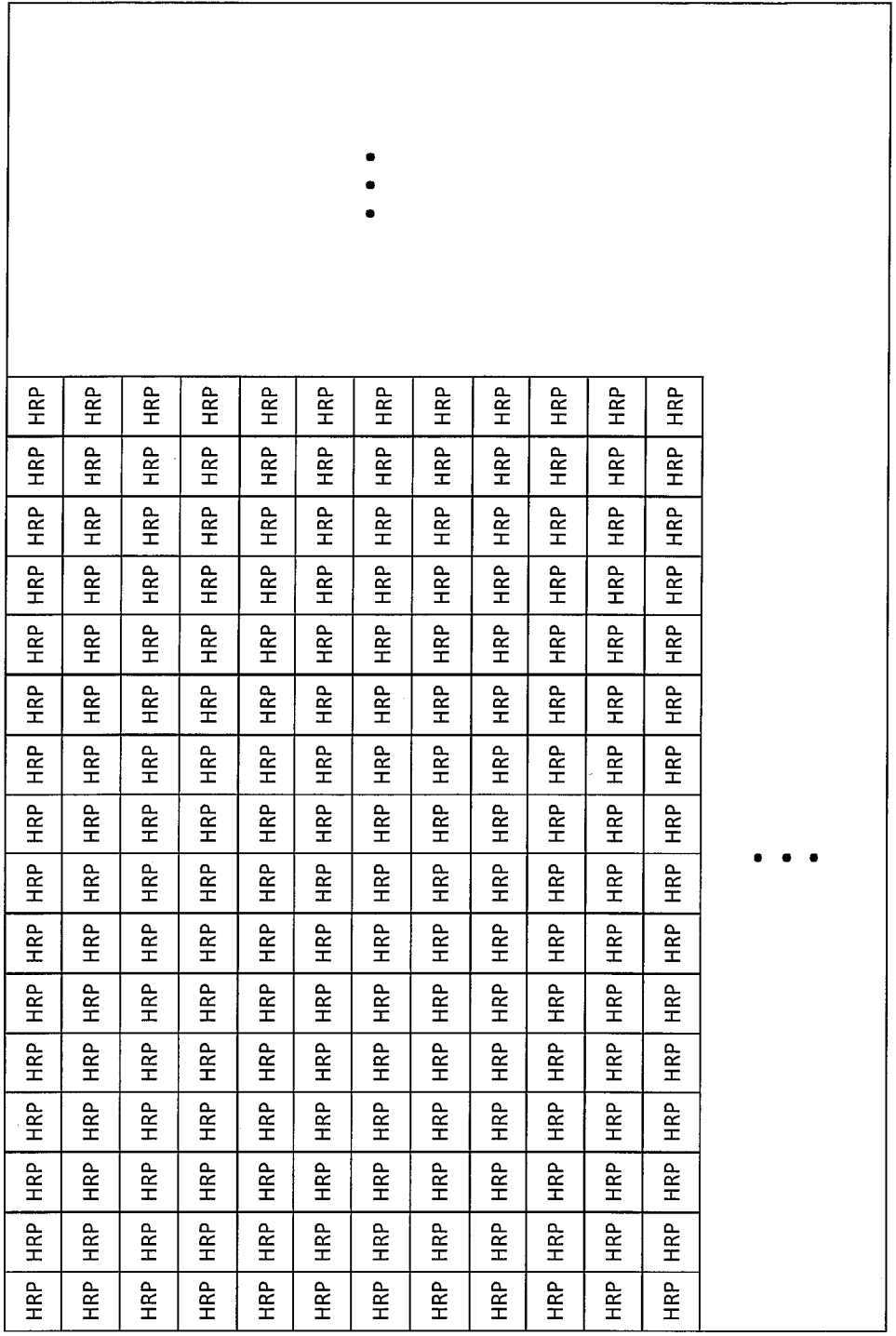
FIG. 5 depicts a high-resolution x-ray image divided into patches in accordance with an embodiment of the invention.

Per step 1020, each HR x-ray image being divided into patches, the patches associated with a same patch region (i.e. a same patch position) are input into a corresponding trained SRPC instance. FIG. 5 depicts a single HR x-ray image being divided into patches, while corresponding SRPC instances are shown in FIG. 4. The inputting of the patches from the multiple HR x-ray images into the corresponding trained SRPC instance may be done in parallel for all patch regions (i.e. for all patch positions).

Per step 1022, each trained SRPC instance outputs a super-resolution (SR) patch based on the set of HR patches which were input into that SRPC instance. This step is illustrated in FIGS. 6A and 6B.

Figure 6A:
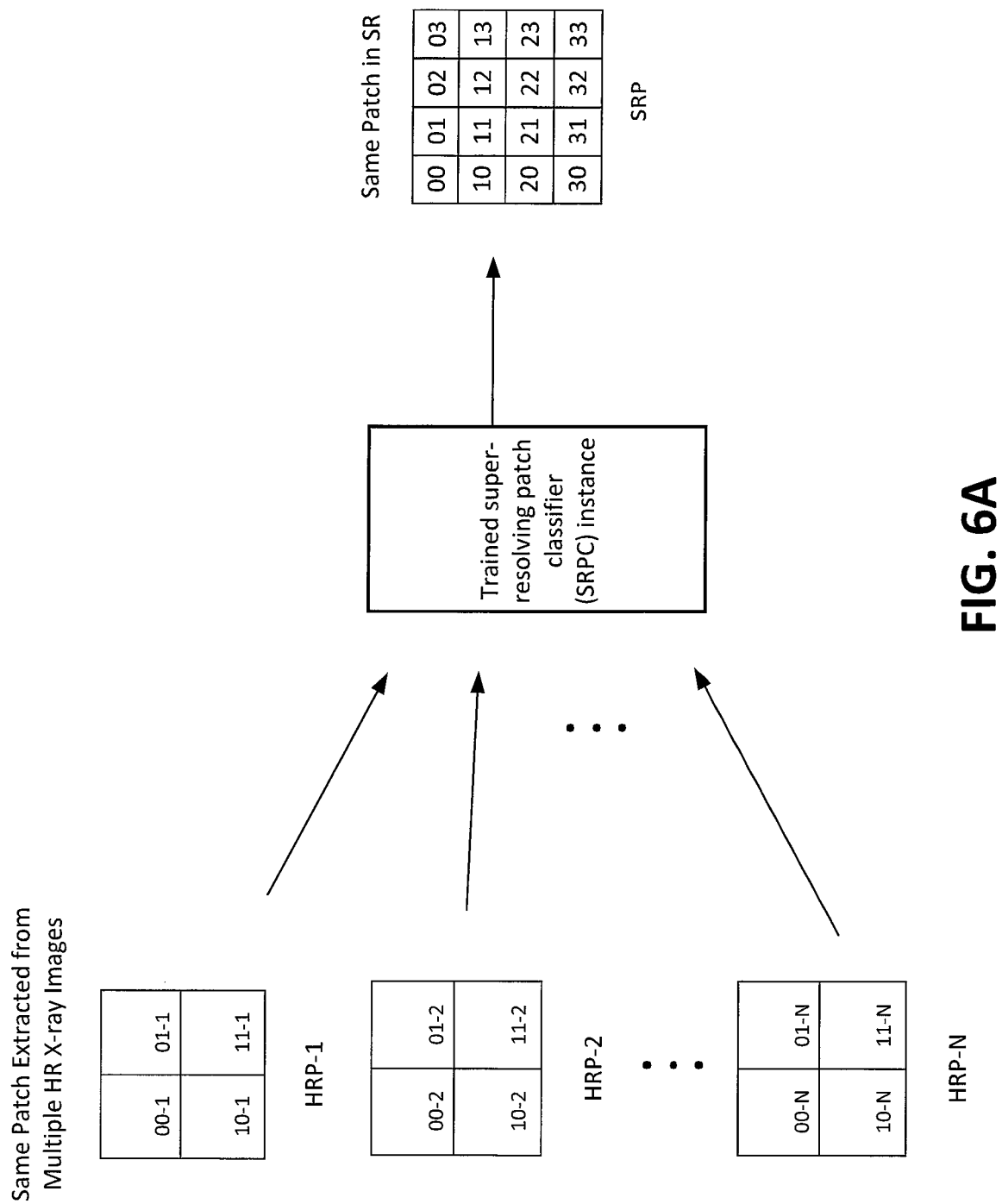
FIG. 6A is a diagram depicting the generation of a super-resolution x-ray patch from multiple high-resolution x-ray patches using a trained super-resolution patch classifier (SRPC) in accordance with an embodiment of the invention.
Figure 6B:
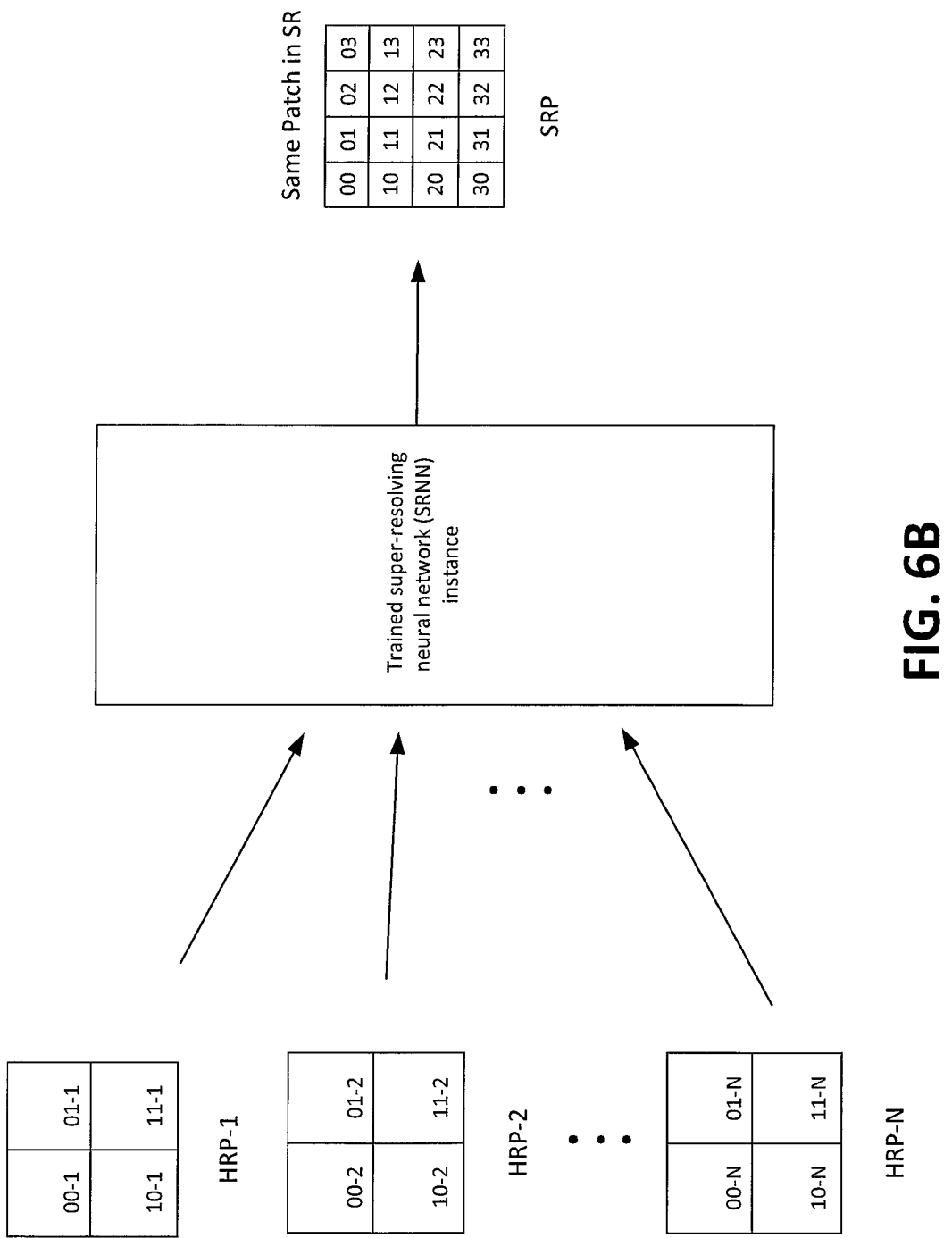
FIG. 6B is a diagram depicting the generation of a super-resolution x-ray patch from multiple high-resolution x-ray patches using a trained super-resolving neural network in accordance with an embodiment of the invention.

As shown in FIG. 6A, the trained SRPC instance receives as inputs a set of N HR patches (HRP-1, HRP-2, . . . , HRP-N). Each HR patch is from a different HR image and corresponds to a same patch region in the HR image.

In the illustrated example, each HR patch has dimensions of 2×2 pixels. In other implementations, each HR patch may have other dimensions, such as for example, 3×3 pixels, 4×4 pixels, or other rectangular dimensions (which need not be square). Each pixel has a multiple bit value. For example, the multiple bit value may be an 8-bit value, 10-bit value, 12-bit value, 16-bit value, or values of other numbers of bits. In the figure, the four pixels of HRP-1 are labeled 00-1, 01-1, 10-1 and 11-1; the four pixels of HRP-2 are labeled 00-2, 01-2, 10-2 and 11-2; . . . ; and the four pixels of HRP-N are labeled 00-N, 01-N, 10-N and 11-N.

The trained SRPC instance outputs a SR patch (SRP) that is based on the set of N input HR patches of the same patch region. The SRP that is output is a super resolution version of that same patch region. In the illustrated example, the SR patch has dimensions of 4×4 pixels (labeled 00, 01, 02, 03, 10, 11, 12, 13, 20, 21, 22, 23, 30, 31, 32 and 33), and each pixel in the SR patch may have a value with the same number of bits as each pixel in the HR patch. In this case, the resolution of the patch region is improved by a factor of 4/2=2 (in each dimension). In other implementations, the SR patch may improve the resolution by other factors, which need not be integers (so long as the factor is greater than one, of course). For example, if the SR patch in FIG. 6A had dimensions of 3×3 pixels (instead of 4×4 pixels), then the resolution would be improved by a factor of 3/2=1.5 (in each dimension). In yet other implementations, each pixel in the SR patch may have a value with the different number of bits as each pixel in the HR patch.

FIG. 6B differs from FIG. 6A in that the SRPC instance is specifically implemented as an instance of a trained super-resolving neural network (SRNN). In an exemplary implementation, the super-resolving neural network may implemented as a deep convolutional network. An example of such a convolutional network is described by Chao Dong et al. in "Super Resolution Using Deep Convolutional Networks," *IEEE Transactions on Pattern Analysis and Machine Intelligence*, Vol. 38, Issue 2, Feb. 1, 2016, the disclosure of which is hereby incorporated by reference.

Other types of regression-based classifiers besides neural networks may also be used to implement the super-resolving patch classifier. One example of a different type of regression-based classifier that may be used is a support vector machine.

Figure 7:
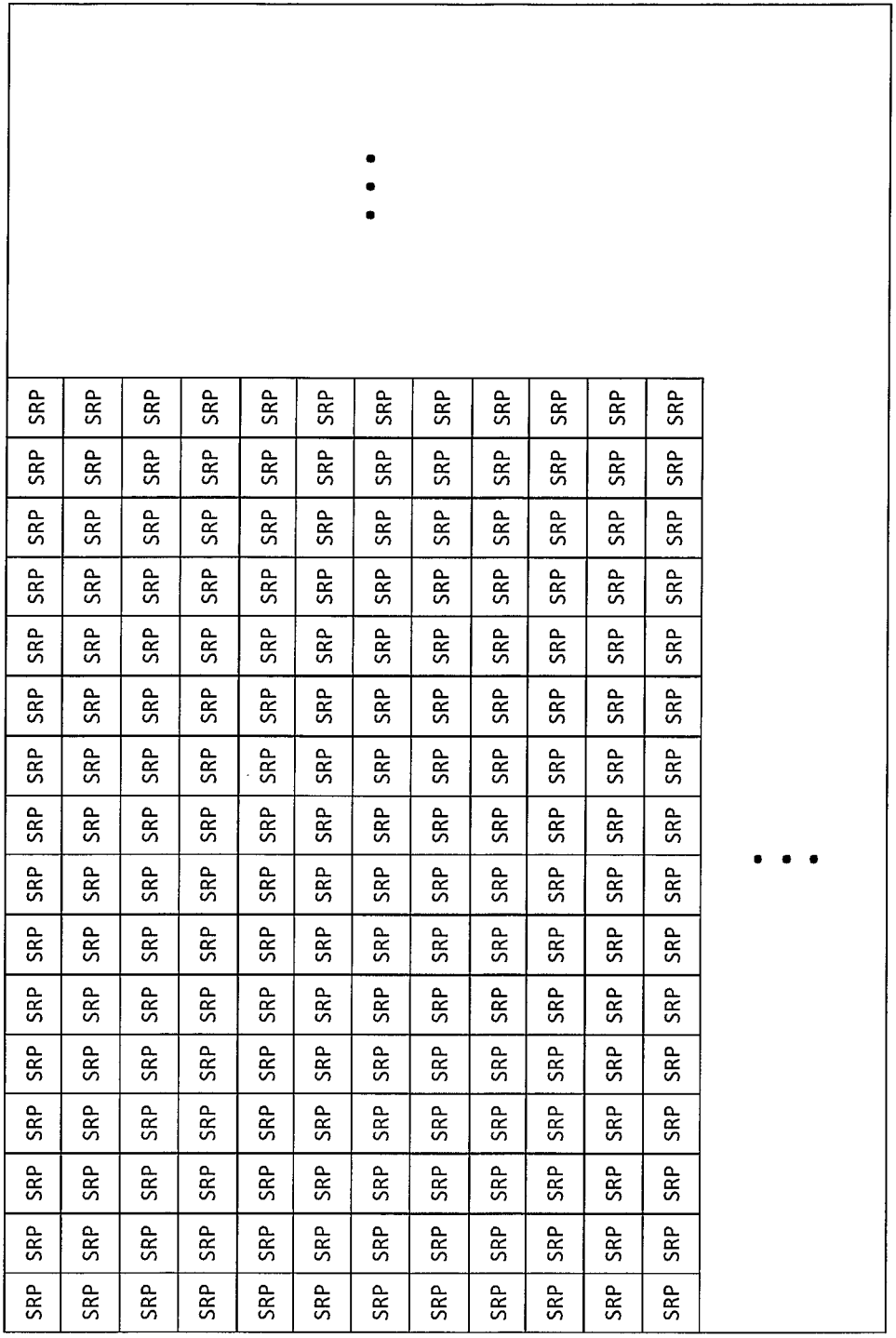
FIG. 7 depicts a super-resolution x-ray image formed from super-resolution patches in accordance with an embodiment of the invention.

Per step 1024, the super-resolution patches (SRPs) for all the patch regions of an image are combined or "stitched together" to form a super-resolution x-ray image (SRXI) of the object. This step is illustrated in FIG. 7. Advantageously, the SRXI of the object may have a higher resolution than the maximum resolution normally possible with the x-ray imager being used. In particular, resolutions that are a fraction of a micron are achievable using this super-resolving technique.

Per step 1026, the super-resolution x-ray image of the object may be used for a practical purpose. For example, consider an object that is a manufactured object, such as a packaged semiconductor, or a printed circuit board, or an interposer, or other manufactured substrate or device. In one use case, the super-resolution x-ray image of such a manufactured object may be displayed on a monitor for viewing by an operator. As another use case, the super-resolution x-ray image may be used for defect detection, which may be performed in an automated manner. As another use case, the super-resolution x-ray image may be used to monitor the manufacturing process.

Per step 1028, a determination may be made as to whether there is another object of same type to image with this super-resolving x-ray imaging technique. If so, then the method 1000 loops back to step 1006 in which the next object to be imaged is positioned in the x-ray imager. Otherwise, if there are no more objects of the same type to be imaged, then method 1000 is done.

While the FIGS. 6A and 6B illustrate an example where the pixel data of the corresponding high-resolution patches themselves are used exclusively as the inputs to the super-resolving patch classifier. Other implementations may input further information beyond the high-resolution patches themselves. For example, the pixel data from neighboring higher-resolution patches may also be utilized.

Figure 8:
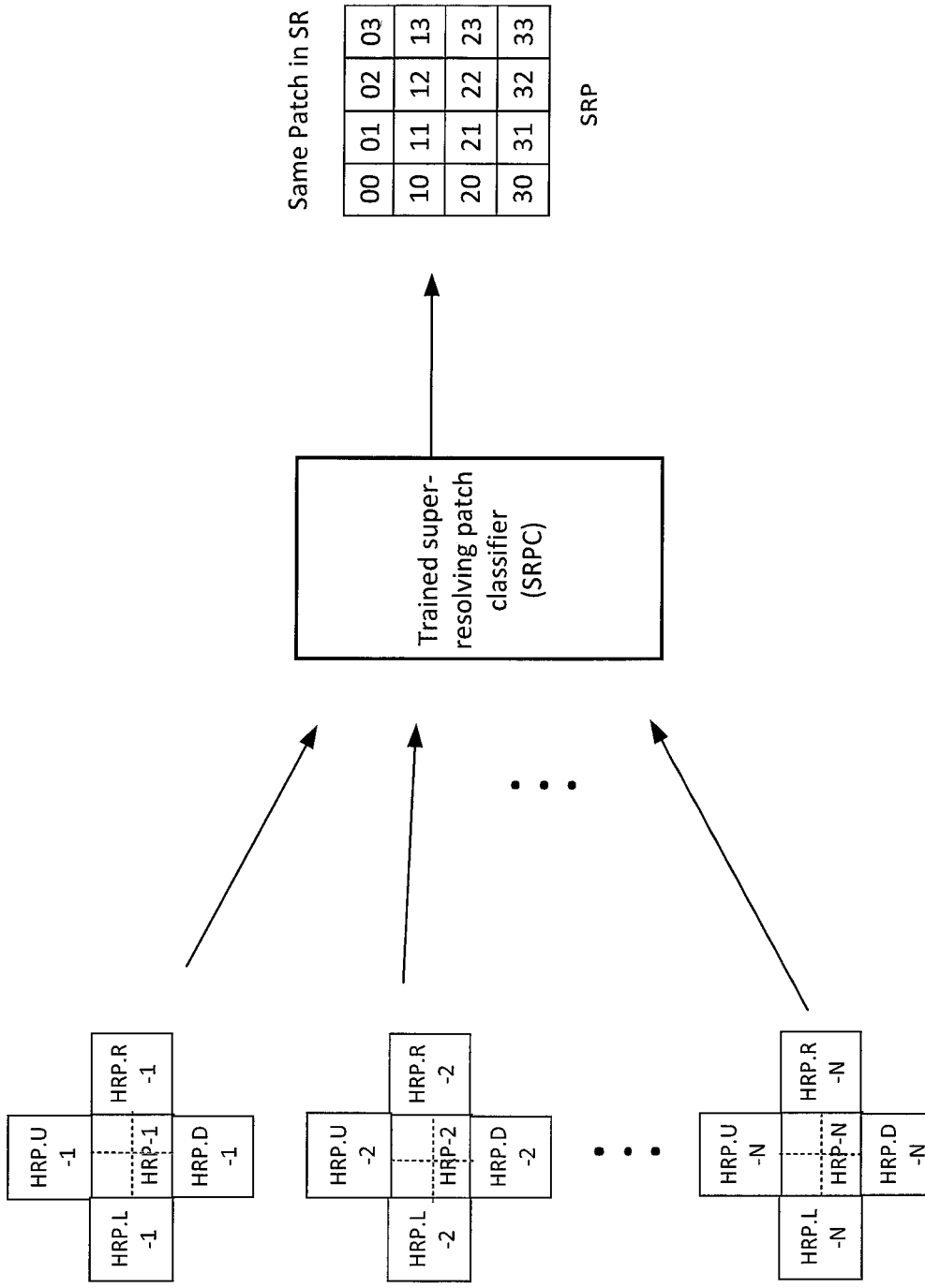
FIG. 8 is a diagram depicting the generation of a super-resolution x-ray patch from corresponding high-resolution x-ray patches and nearest-neighbor patches using a trained super-resolution patch classifier in accordance with an embodiment of the invention.

FIG. 8 is a diagram depicting the generation of a super-resolution x-ray patch from corresponding high-resolution x-ray patches and nearest-neighbor patches using a trained super-resolution patch classifier in accordance with an embodiment of the invention. As depicted, the input to the SRPC includes not only the pixel data of the corresponding high-resolution patches (HRP-1, HRP-2, . . . , HRP-N) but also the pixel data of the four nearest-neighbor high-resolution patches to each high-resolution patch. The four nearest-neighbor patches include the up-neighbor high-resolution patches (HRP.U-1, HRP.U-2, . . . , HRP.U-N), the down-neighbor high-resolution patches (HRP.D-1, HRP.D-2, . . . , HRP.D-N), the left-neighbor high-resolution patches (HRP.L-1, HRP.L-2, ..., HRP.L-N), and the right-neighbor high-resolution patches (HRP.R-1, HRP.R-2, ..., HRP.R-N).

For high-resolution patches at the edge of an image frame, the information that it is positioned at an edge may be indicated, for example, by there being no pixel data for the nearest-neighbor patch beyond the edge. For high-resolution patches at the corner of an image frame, the information that it is positioned at a corner may be indicated, for example, by there being no pixel data for the nearest-neighbor patches beyond the two corner edges.

Figure 9:
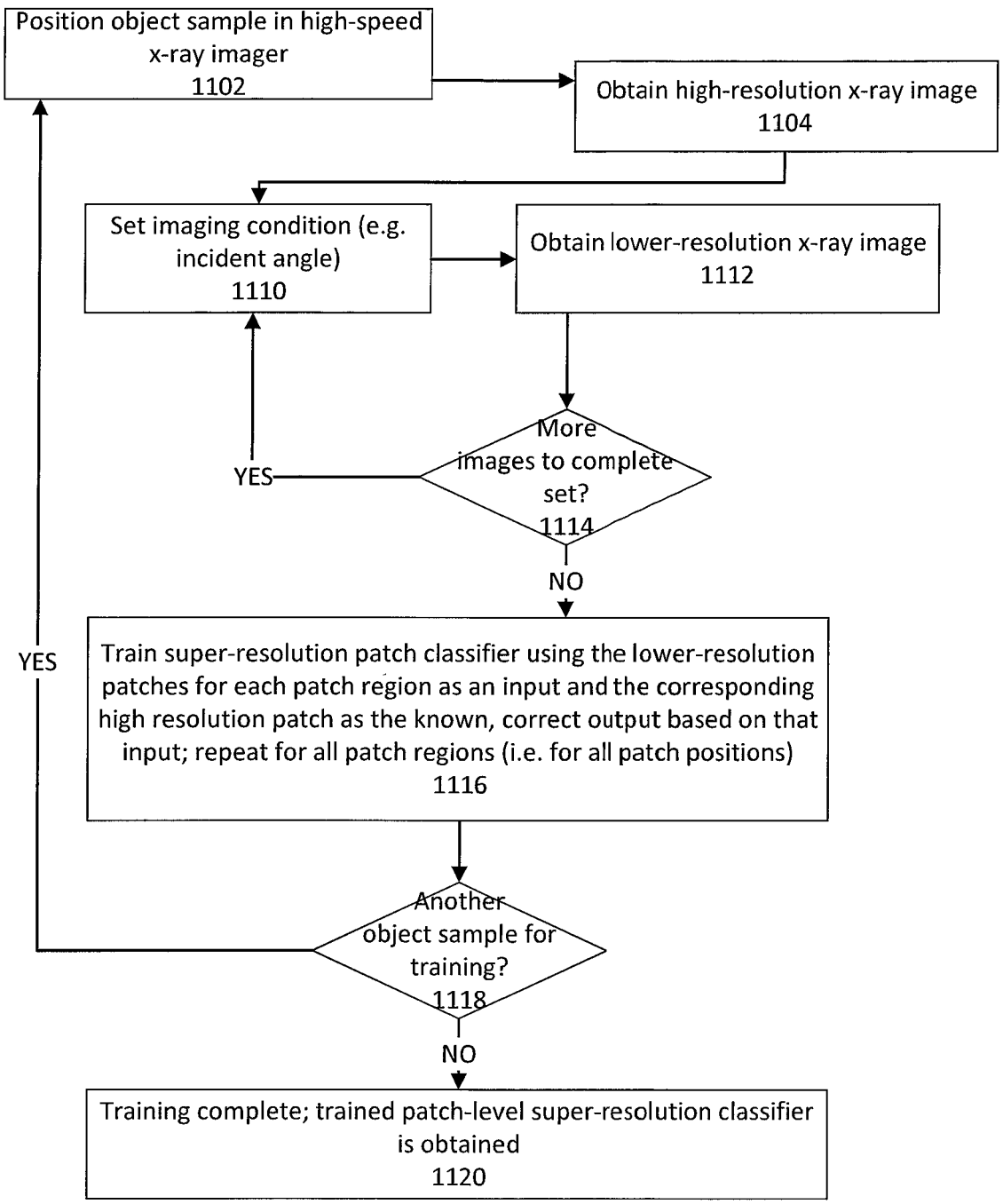
FIG. 9 is a flow chart of an exemplary method of training a super-resolving patch classifier in accordance with an embodiment of the invention.

FIG. 9 depicts an exemplary method 1100 of training a super-resolving patch classifier in accordance with an embodiment of the invention. This method 1100 may be used to implement the training step 1002 in FIG. 3. The method 1100 may be performed, for example, under control of a patch classifier training module (PCTM) which may be executed, for example, by the computer system 700 in FIG. 1A or FIG. 1B.

In step 1102, an object sample is positioned in the high-speed x-ray imager. The object sample may be the same type of object that will be super-resolution x-ray imaged by the method 1000 of FIG. 3. For example, if the objects to be imaged are a certain type of packaged semiconductor, then the object sample may be of the same type of packaged semiconductor.

In step 1104, a high-resolution x-ray image of the object sample may be obtained. The high-resolution x-ray image may be obtained at the highest resolution setting, or a setting near the highest resolution setting, of the x-ray imager. In this training method 1100, the high-resolution x-ray image is not used as an input to the SRPC; instead, the high-resolution x-ray image is used as a "correct" output of the SRPC for the purpose of training the SRPC.

In step 1110, the imaging condition for the x-ray imager is set. In an exemplary implementation, the imaging condition may be set by setting the angle of incidence of the x-rays onto the surface of the object. For example, the angle of incidence may be set by controlling the source position using, for example, the mount 106 to move the source 100 in the high-speed x-ray imager of FIG. 1A. In an alternate implementation, the imaging condition may be set by setting a lateral position of the detector using, for example, the controller 60 and driver 62 in the apparatus of FIG. 1B. In another alternate implementation, the imaging condition may be set by setting a lateral position of the object being imaged using, for example, the controller 70 and driver 72 in the apparatus of FIG. 1B.

Per step 1112, a lower-resolution x-ray image of the object is obtained. In an exemplary implementation, the previously-obtained high-resolution x-ray image in step 1104 is of a resolution that is higher by a specific factor than the resolution of the lower-resolution image obtained in this step. This specific factor is the same as the factor in FIG. 6A that the resolution of the super-resolution patch output by the SRPC is higher than the resolution of the high-resolution patches input to the SRPC.

For example, if the high-resolution patches have resolution of 1 micron and the super-resolution patches have a resolution of 0.5 microns for super-resolution x-ray imaging, then the specific factor is 2. As such, in this case, the high-resolution x-ray image obtained in step 1104 would be at a resolution that is 2 times (in each dimension) the resolution of the lower-resolution x-ray image obtained in step 1112. For example, the high-resolution x-ray image obtained in step 1104 may be at a resolution of 1 micron, and the lower-resolution obtained in step 1112 may be at a resolution of 2 microns.

Per step 1114, a determination may be made as to whether there are further x-ray images to be obtained so as to complete the set of N lower-resolution x-ray images. If there are more x-ray images to be obtained to complete the set of N lower-resolution x-ray images, then the method 1100 may loop back to perform step 1110. Otherwise, if the set of N lower-resolution x-ray images is complete, then the method 1100 may move forward to step 1116.

Figure 10:
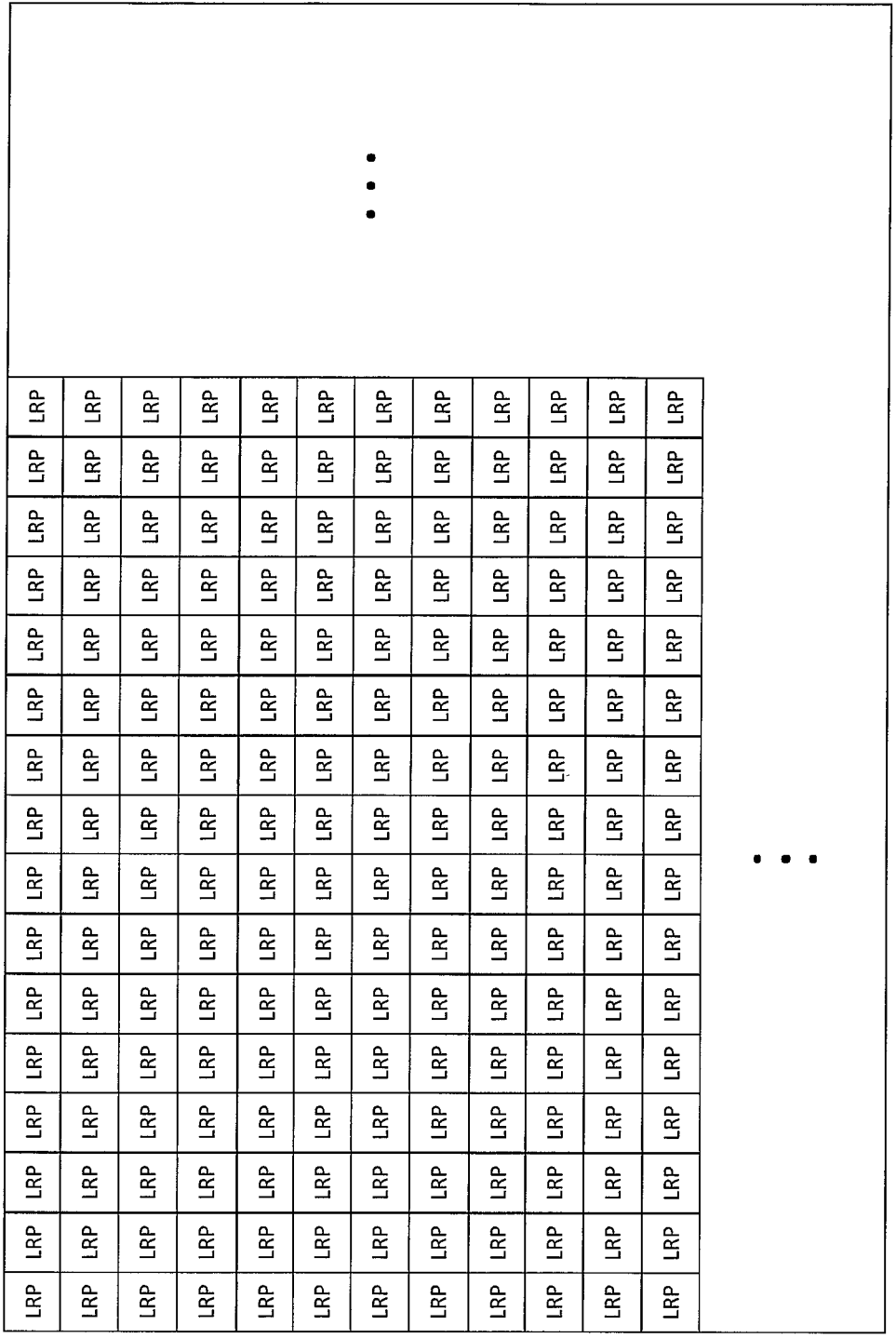
FIG. 10 depicts a low-resolution x-ray image divided into patches for use in training an SRPC in accordance with an embodiment of the invention.
Figure 11:
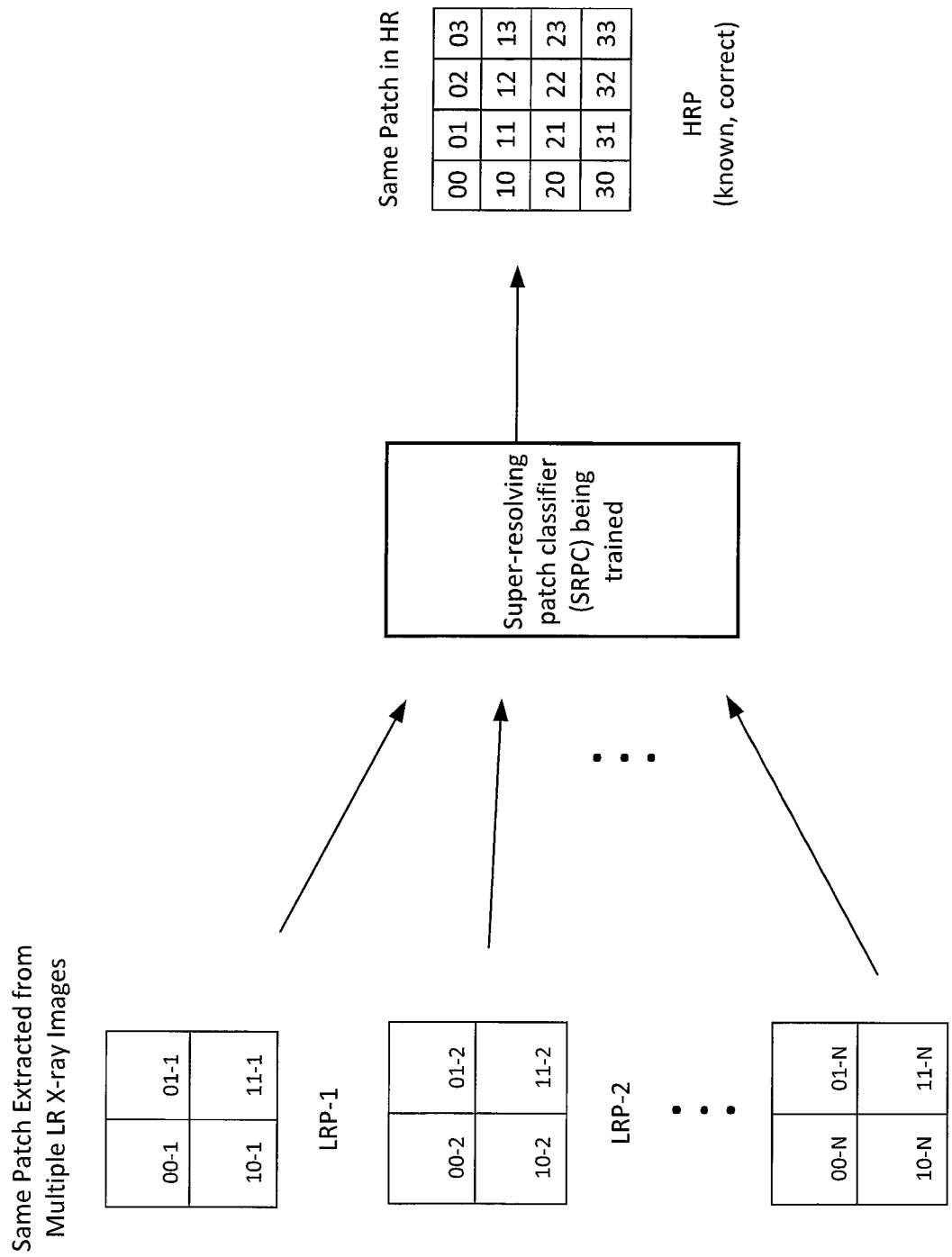
FIG. 11 is a diagram depicting the training of a super-resolution patch classifier using multiple lower-resolution patches as inputs and a corresponding high-resolution patch as known, correct output in accordance with an embodiment of the invention.

Per step 1116, each LR x-ray image being divided into patches as illustrated in FIG. 10, the LR patches associated with a same patch region (i.e. a same patch position) are used as input into the SRPC being trained, where the known correct output is the corresponding HR patch of the HR x-ray image obtained in step 1104. This training step is illustrated in FIG. 11. As shown in FIG. 11, the training of a super-resolution patch classifier uses multiple lower-resolution patches as inputs and a corresponding high-resolution patch as a known, correct output in accordance with an embodiment of the invention. This training step shown in FIG. 11 may be repeated for all patch regions (i.e. for all patch positions).

Further object samples of the same may be used for training the SRPC. Per step 1118, if there is another object sample to be used for training, then the method 1100 loops back to step 1102. Otherwise, the training is complete, and the trained SRPC is obtained per step 1120.

CONCLUSION

In the present disclosure, numerous specific details are provided, such as examples of systems, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of super-resolution x-ray imaging, the method comprising:
    obtaining a set of high-resolution x-ray images of an object;
    dividing each of the high-resolution x-ray images in the set into high-resolution patches;
    for each patch region, inputting the high-resolution patches corresponding to the patch region to an instance of a trained super-resolving patch classifier to generate a super-resolution patch for the patch region; and
    stitching together the super-resolution patches for the patch regions to obtain a super-resolution x-ray image of the object.

2. The method of claim 1, wherein the set of high-resolution x-ray images of the object are obtained by
    changing an imaging condition;
    acquiring a high-resolution x-ray image using the imaging condition; and
    repeating the changing and acquiring steps until the set of high-resolution x-ray images is complete.

3. The method of claim 2, wherein changing the imaging condition results in a sub-pixel shift from one high-resolution x-ray image to a next high-resolution x-ray image in the set.

4. The method of claim 3, wherein the imaging condition comprises an incident angle of the x-ray beam.

5. The method of claim 4, wherein the incident angle is changed by varying a position of an x-ray source.

6. The method of claim 3, wherein the imaging condition comprises a position of an x-ray detector.

7. The method of claim 3, wherein the imaging condition comprises a position of the object.

8. The method of claim 1, wherein the super-resolving patch classifier comprises a regression classifier.

9. The method of claim 8, wherein the regression classifier comprises an artificial neural network.

10. The method of claim 8, wherein the regression classifier comprises a support vector machine.

11. The method of claim 1, further comprising:
displaying the super-resolution x-ray image on a monitor.

12. The method of claim 1, further comprising:
using the super-resolution x-ray image for detecting defects in the object.

13. The method of claim 1, wherein the super-resolution x-ray image is used for process monitoring.

14. The method of claim 1, wherein the super-resolution x-ray image has a resolution that is smaller in size than the high-resolution x-ray image by at least a factor of two.

15. An apparatus for super-resolution x-ray imaging of an object, the apparatus comprising:
an x-ray imager; and
a computer system for controlling the x-ray imager, wherein the computer system comprises a super-resolving imaging module, the super-resolution imaging module performing steps including:
obtaining a set of high-resolution x-ray images of the object;
dividing each of the high-resolution x-ray images in the set into high-resolution patches;
for each patch region, inputting the high-resolution patches corresponding to the patch region to an instance of a trained super-resolving patch classifier to generate a super-resolution patch for the patch region; and
stitching together the super-resolution patches for the patch regions to obtain a super-resolution x-ray image of the object.

16. The apparatus of claim 15, wherein the set of high-resolution x-ray images of the object are obtained by the super-resolution imaging module performing steps of:
changing an imaging condition;
acquiring a high-resolution x-ray image using the imaging condition; and
repeating the changing and acquiring steps until the set of high-resolution x-ray images is complete.

17. The apparatus of claim 16, wherein the imaging condition comprises an incident angle of the x-ray beam.

18. The apparatus of claim 17, wherein the super-resolution imaging module changes the incident angle by varying a position of an x-ray source.

19. The apparatus of claim 16, wherein the imaging condition comprises a position of an x-ray detector.

20. The apparatus of claim 16, wherein the imaging condition comprises a position of the object.

21. The apparatus of claim 15, wherein the super-resolving patch classifier comprises a regression classifier.

22. The apparatus of claim 21, wherein the regression classifier comprises an artificial neural network.

23. The apparatus of claim 21, wherein the regression classifier comprises a support vector machine.

24. The apparatus of claim 15, wherein the apparatus displays the super-resolution image on a monitor.

25. The apparatus of claim 15, wherein the apparatus comprises an inspection machine that uses the super-resolution x-ray image for detecting defects in the object.

26. The apparatus of claim 15, wherein the super-resolution x-ray image is used for process monitoring.

27. The apparatus of claim 15, wherein the super-resolution x-ray image has a resolution that is smaller in size than the high-resolution x-ray image by at least a factor of two.

* * * * *